Dec. 28, 1943. T. HIROMI ET AL 2,337,997
METHOD OF MAKING PISTON RINGS
Filed May 22, 1939

Inventors.
TETSUTARO HIROMI
RYOZO YANAGIDA
By Attorney.

UNITED STATES PATENT OFFICE 2,337,997

METHOD OF MAKING PISTON RINGS

Tetsutaro Hiromi, Yodobashi-ku, Tokyo, and Ryozo Yanagida, Nihonbashi-ku, Tokyo, Japan; vested in the Alien Property Custodian Application May 22, 1939, Serial No. 275,082
In Japan March 7, 1939

1 Claim. (Cl. 29—156.63)

This invention relates to a method of making piston rings of uniform stress, and has for its object to provide a method of making simply and cheaply improved piston rings which shall exert substantially uniform pressure on the wall of a cylinder.

Although not limited to its application thereto, the invention is particularly applicable to the method of making piston rings of relatively large size for use in connection with Diesel engines, steam engines, compressors and the like.

It is known to make a piston ring by first preparing a blank having a greater diameter than that of a finished ring, cutting away a portion of the blank to produce a suitable gap, then reducing the diameter of the blank by clamping it until the gap disappears, holding the ends of the blank firmly together by means of a pin or the like, finishing the periphery to the desired diameter and then removing the pin.

Known piston rings constructed in this manner present the serious disadvantage that the parts secured together by the pin will no longer be able to change the curvature, and, moreover, if the pin were improperly forced in, there would be no remedy for correcting it.

Since scored or scratches are made in the cylinder wall mostly where the ends of the piston ring make sliding contact with the wall of the cylinder, such parts of the ring must be worked and finished with the greatest possible care. As a result of research, we have found that a piston ring which was made by bringing together the cut ends carelessly and working the periphery without permitting any free displacement at the ends, as is the case with the known practice, does not show, in the finished product, a uniform curvature and if such a ring is placed in a cylinder the pressure exerted by the ring is not uniformly distributed in the cylinder wall but is liable to become even negative at one end. (See the pressure distribution curve shown in Figure 1 of the accompanying drawing.)

The main object of this invention is to provide a method which will yield piston rings in which this drawback is obviated or substantially reduced.

According to this invention, a piston ring of uniform stress is produced from a ring blank having a greater diameter than that required in the finished product by cutting away a portion of the metal to make a gap, forming a hooked scarf by means of which the gap is closed tangentially and finishing the periphery to the desired diameter.

By the invention, the cut ends engage with each other simply by means of a scarf joint, so that the jointed ends are not firmly secured together but are allowed to make free displacement while, moreover, the clamping operation is so simple and easy that no harmful force can be introduced during the clamping operation. Even if the ring blank were incorrectly clamped, the ends would automatically slide relatively to each other, thereby taking the free form. Re-clamping is also possible at any time, since the ends engage simply by means of a hooked scarf. When the ends are thus engaged and the periphery of the ring is finshed in this condition to the desired diameter, the resultant product will exert substantially uniform pressure on the cylinder wall with which it engages.

The invention is illustrated in and further explained in connection with the accompanying drawing, in which:

Figures 4A to 6A show perspective views of the finished gaps of Figures 4 to 6, respectively.

Figure 1:
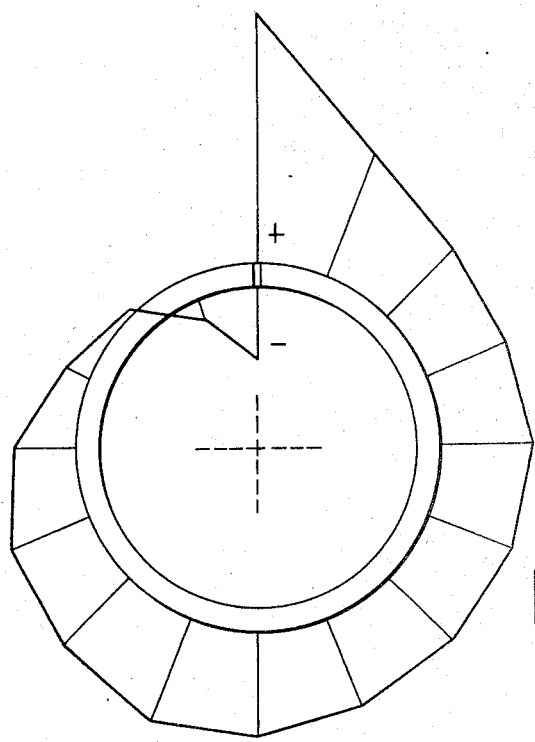
Figure 1 is a diagram showing the varying stress distribution in the ring manufactured by the known method.
Figure 2:
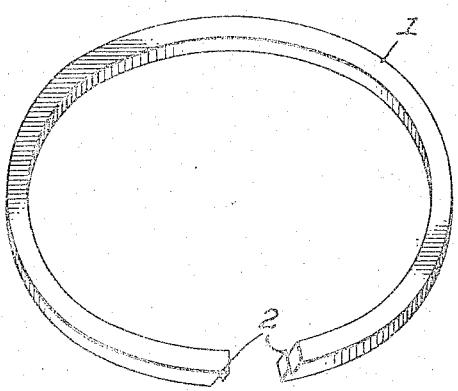
Figure 2 is a perspective view of a ring blank with the milling cut made therein for forming a hooked scarf according to this invention.
Figure 3:
Figure 3 is a front elevation of the blank with the cut ends engaging with each other.

In carrying out the invention, a portion of a ring blank I is cut away to make a gap, and hooks 2, 2 are formed in the cut ends, as shown in Figure 2, preferably by a milling operation. The gap is then closed by tightening a clamping belt or the like which is wound around the blank body I, so that the hooks 2, 2 engage with each other to form a scarf joint, as shown in Figure 3. After removing the belt, the blank I is attached to a face-lathe or the like whereby its periphery is finished to the desired diameter. If the ring is to be finished in two steps, then the ring as above treated is re-clamped by a belt to a uniformly stressed condition in which it is again submitted to a finishing operation. If such a process is repeatedly carried out, the stress distribution in the ring will be greatly improved.

The hooked ends of the blank are finally finished by means of a file or the like to produce the gap form required in the finished piston ring.

Figure 4:
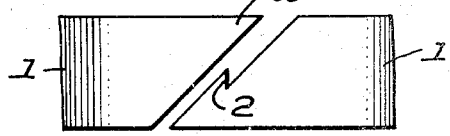
Figures 4 to 6 show three modifications of the finished ring gap.
Figure 4A:
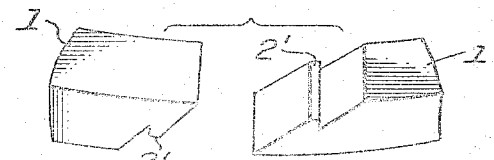
Figure 5:
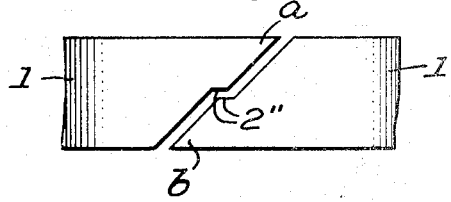
Figure 5A:
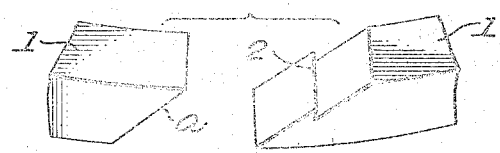
Figure 6:
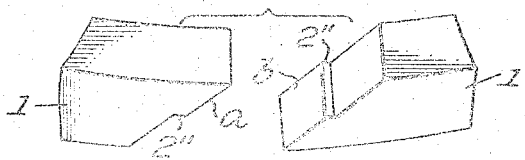

Three forms of the gap are shown in Figure 4. Thus,

The ring of which the hooks are filed off to such an extent that the tips 2', 2' no longer engage with each other, as shown in A of Figure 4, is substantially air-tight at this point and, therefore, may be used in compressors, but not in heat engines.

The ring of which one hook is filed away, as shown in B of Figure 4, is suitable for use in all sort of engines.

The ring of which the hooks are filed flat as shown at 2", 2" in C of Figure 4 and the faces a and b finished suitably, will maintain a gap of a suitable width when inserted in the cylinder and, therefore, is suitable for use in high heat engines. This form of ring is obviously more air-tight than the known ring having a simple diagonal gap, and also is less susceptible to carbon deposit than those having a gap of the "lap" type.

What we claim as new and desire to secure by Letters Patent of the United States, is:

A method of making a piston ring of uniform stress, consisting in cutting away a portion of a ring blank having a diameter greater than that required in a finished ring to produce a gap in the ring forming hooks on the margins defining the gap to constitute an interlocking scarf joint when the ends are drawn tangentially toward each other, clamping the ring to interlock the scarf joint, finishing the outer periphery of the ring to size, and cutting away one of the scarf joint sections completely on one of the ends of the gap in the ring.

TETSUTARO HIROMI.
RYOZO YANAGIDA.